(12) United States Patent
Park et al.

(10) Patent No.: US 11,554,782 B2
(45) Date of Patent: Jan. 17, 2023

(54) APPARATUS OF CONTROLLING ENGINE INCLUDING ELECTRIC SUPERCHARGER BASED ON DRIVER'S TENDENCY, AND METHOD THEREOF

(71) Applicants: HYUNDAI MOTOR COMPANY, Seoul (KR); KIA MOTORS CORPORATION, Seoul (KR)

(72) Inventors: Yeongseop Park, Seoul (KR); Dong Hee Han, Seongnam-si (KR); Hyun Woo Lim, Hwaseong-si (KR); Buhm Joo Suh, Hwaseong-si (KR); Jinkuk Cho, Hwaseong-si (KR); Kwanhee Lee, Suwon-si (KR); Sungchan Na, Seongnam-si (KR); Jihyun Park, Hwaseong-si (KR); Seungwoo Hong, Seoul (KR); Yong Kak Choi, Seoul (KR); Hyunjin Kang, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 221 days.

(21) Appl. No.: 16/870,323

(22) Filed: May 8, 2020

(65) Prior Publication Data
US 2021/0146935 A1 May 20, 2021

(30) Foreign Application Priority Data
Nov. 19, 2019 (KR) .......................... 10-2019-0148924

(51) Int. Cl.
*B60W 40/09* (2012.01)
*B60W 10/06* (2006.01)
(Continued)

(52) U.S. Cl.
CPC ............ *B60W 40/09* (2013.01); *B60W 10/06* (2013.01); *B60W 10/08* (2013.01); *B60W 10/26* (2013.01);
(Continued)

(58) Field of Classification Search
CPC ....... B60W 10/06; B60W 10/08; B60W 10/26; B60W 10/30; B60W 20/13; B60W 20/15;
(Continued)

(56) References Cited

U.S. PATENT DOCUMENTS

| 2011/0289919 A1* | 12/2011 | Oyagi | ..................... F02B 37/12 60/612 |
| 2014/0100729 A1* | 4/2014 | Jung | ..................... B60W 20/40 180/65.265 |

(Continued)

*Primary Examiner* — Tyler J Lee
*Assistant Examiner* — Yufeng Zhang
(74) *Attorney, Agent, or Firm* — Lempia Summerfield Katz LLC (57) ABSTRACT

An apparatus of controlling an engine including an electric supercharger includes: an engine to combust fuel to generate power; a drive motor to assist the power of the engine and selectively operate as a generator to generate electrical energy; a battery configured to supply electrical energy to the drive motor and to be charged by the electrical energy generated from the drive motor; a plurality of electric superchargers respectively installed in a plurality of intake lines through which an ambient air flows to be supplied to a combustion chamber of the engine; and a controller that based on a determined driving tendency, adjusts a target speed of the electric superchargers of the plurality of electric superchargers, determine a driving mode of the electric superchargers, limits a maximum output of the engine, and variably adjusts a SOC electricity-generating region where the engine charges the battery.

12 Claims, 9 Drawing Sheets

(51) Int. Cl.
   *B60W 10/26* (2006.01)
   *B60W 10/08* (2006.01)
   *B60W 20/13* (2016.01)
   *B60W 20/15* (2016.01)
   *B60W 30/182* (2020.01)
   *B60W 50/00* (2006.01)

(52) U.S. Cl.
   CPC ............ *B60W 20/13* (2016.01); *B60W 20/15* (2016.01); *B60W 30/182* (2013.01); *B60W 2050/0022* (2013.01); *B60W 2050/0052* (2013.01); *B60W 2510/0666* (2013.01); *B60W 2510/244* (2013.01); *B60W 2520/10* (2013.01); *B60W 2540/30* (2013.01); *B60W 2710/0666* (2013.01)

(58) Field of Classification Search
   CPC . B60W 2050/0022; B60W 2050/0052; B60W 2510/0666; B60W 2510/244; B60W 2520/10; B60W 2540/30; B60W 2710/0666; B60W 2710/0677; B60W 2710/244; B60W 2710/30; B60W 30/182; B60W 40/09; B60W 2510/0633; B60W 2710/0638; Y02T 10/62; Y02T 10/70; F02D 41/0007; F02D 23/00
   See application file for complete search history.

(56) References Cited

U.S. PATENT DOCUMENTS

2017/0036662 A1* 2/2017 Chen .................. B60W 30/182
2020/0398816 A1* 12/2020 Higuchi ................ B60W 20/17

\* cited by examiner

APPARATUS OF CONTROLLING ENGINE INCLUDING ELECTRIC SUPERCHARGER BASED ON DRIVER'S TENDENCY, AND METHOD THEREOF

CROSS-REFERENCE TO RELATED APPLICATION

This application claims priority to and the benefit of Korean Patent Application No. 10-2019-0148924, filed on Nov. 19, 2019, the entire contents of which are incorporated herein by reference.

FIELD

The present disclosure relates to an apparatus of controlling an engine including an electric supercharger.

BACKGROUND

The statements in this section merely provide background information related to the present disclosure and may not constitute prior art.

A hybrid vehicle is a vehicle using two or more power sources and generally refers to a hybrid electric vehicle driven using an engine and a motor. A hybrid electric vehicle may form various structures using two or more power sources including an engine and a motor.

In general, a hybrid electric vehicle uses a power train in a manner of a transmission mounted electronic device (TMED) in which a drive motor, a transmission, and drive shaft are connected in series to each other.

In addition, a clutch is disposed between an engine and a motor, and the hybrid electric vehicle is driven in an electric vehicle (EV) mode or in a hybrid electric vehicle (HEV) mode, depending on whether the clutch is engaged, The EV mode is a mode in which a vehicle is driven by only driving torque of a drive motor, and the HEV mode is a mode in which the vehicle is driven by driving torque of the drive motor and the engine.

In the hybrid vehicle, it is very important to manage the state of charge (SOC), which is a charged amount of a battery that supplies electric power to the drive motor and electrical components provided in the vehicle.

In the case that a battery's SOC is low and the vehicle is run by only an output power of the engine without assistance of the drive motor, when a high driving load of the vehicle is desired (e.g., a very high speed driving situation, a continuous up-climbing driving situation, a driving situation on a highland, etc.), the driving speed may be deteriorated, and fuel efficiency and exhaust gas may become worse due to an excessively required output and a high engine speed of the engine.

On the other hand, the customer's satisfaction with respect to the vehicle's driving performance depends on how much closely to the customer's tendency the vehicle may run. Since a single vehicle type typically has only a single vehicle performance characteristic although the customer's tendency may be diverse, a discrepancy between the customer's driving tendency and the vehicle's reaction may occur. Accordingly, customers often complain about the vehicle's driving performance. That is, the customer's satisfaction with respect to driving performance may be maximized by grasping a customer's driving tendency of and controlling shifting such that the vehicle reacts appropriately to the customer's driving tendency.

However, we have discovered that it may be difficult to stably maintain a SOC of the battery regardless of a driver's driving tendency. For example, although an insufficient engine output should be assisted by the drive motor in order to satisfy a sporty driver's driving tendency, there is a limit to increase the output power of the drive motor when the SOC of the battery is low.

The above information disclosed in this Background section is only for enhancement of understanding of the background of the present disclosure, and therefore it may contain information that does not form the prior art that is already known to a person of ordinary skill in the art.

SUMMARY

The present disclosure provides an apparatus of controlling an engine including an electric supercharger based on a driver's tendency and a method thereof, having advantages of securing driving performance of a vehicle having an engine system including an electric supercharger and stably managing a SOC of a battery.

An apparatus of controlling an engine including an electric supercharger based on a driver's tendency includes: an engine configured to combust fuel to generate power; a drive motor configured to assist the power of the engine and to selectively operate as a generator to generate electrical energy; a battery configured to supply electrical energy to the drive motor and to be charged by the electrical energy generated from the drive motor; a plurality of electric superchargers respectively installed in a plurality of intake lines through which an ambient air flows to be supplied to a combustion chamber of the engine; and a controller that based on a driving tendency of a driver, adjusts a target speed of electric superchargers of the plurality of superchargers, determines a driving mode of the electric superchargers, limits a maximum output of the engine, and variably adjust a state of charge (SOC) electricity-generating region in which the engine charges the battery.

The controller may adjust the target speed by differently adjusting a size of a gain of a speed filter applied to the target speed of the electric superchargers of the plurality of superchargers based on the driving tendency of the driver.

In one form, the driving tendency may be divided into a sporty tendency, a normal tendency, and a mild tendency. When the driving tendency of the driver is the sporty tendency, the controller may apply a maximum value to the size of the gain. When the driving tendency is the mild tendency, the controller may apply a minimum value to the size of the gain. When the driving tendency is the normal tendency, the controller may determine the size of the gain as a value between the maximum value and the minimum value.

The controller may adjust the target speed by varying a speed change rate applied to the target speed of the electric superchargers based on the driving tendency of the driver.

In another form, when the driving tendency of the driver is the sporty tendency, the controller may set a slope of the speed change rate applied to the target speed to be a maximum value. When the driving tendency is the mild tendency, the controller may set a slope of the speed change rate applied to the target speed to be a minimum value. When the driving tendency is the normal tendency, the controller may set a slope of the speed change rate applied to the target speed to be a value between the maximum value and the minimum value.

In other form, when the driving tendency of the driver is the sporty tendency, the controller may set the engine to output a maximum torque. When the driving tendency is the normal tendency, the controller may set the engine to output an intermediate torque smaller than the maximum torque. When the driving tendency is the mild tendency, the controller may set the engine to output a minimum torque smaller than the intermediate torque.

In some forms of the present disclosure, the driving tendency of the driver may be divided into a sporty tendency, a normal tendency, and a mild tendency. The SOC electricity-generating region may correspond to a region covering from a SOC start value at which the engine starts charging the battery to a SOC finish value at which the engine finishes charging the battery.

When the driving tendency of the driver is the mild tendency, the controller may set the SOC start value to a SOC minimum value within a SOC-low region, and sets the SOC finish value to a SOC minimum value within a SOC-normal region. When the driving tendency is the sporty tendency, the controller may set the SOC start value to a SOC maximum value within the SOC-low region, and sets the SOC finish value to a SOC maximum value within the SOC-normal region. When the driving tendency is the normal tendency, the controller may set the SOC start value to a SOC intermediate value between the SOC minimum value within the SOC-low region and the SOC maximum value within the SOC-normal region, and sets the SOC finish value to a SOC intermediate value between the SOC minimum value within the SOC-normal region and the SOC maximum value within the SOC-normal region.

An exemplary method of controlling an engine including an electric supercharger includes: determining, by a controller, a driving tendency of the driver; adjusting, by the controller, a target speed of a plurality of electric superchargers based on the determined driving tendency; determining, by the controller, a driving mode of the plurality of electric superchargers based on the determined driving tendency; and variably adjusting, by the controller, based on the determined driving tendency, a state of charge (SOC) electricity-generating region where the engine charges a battery.

In adjusting the target speed, the target speed may be adjusted by differently adjusting a size of a gain of a speed filter applied to the target speed of the plurality of electric superchargers according to the determined driving tendency of the driver.

The determined driving tendency of the driver may be divided into a sporty tendency, a normal tendency, and a mild tendency. When the determined driving tendency is the sporty tendency, a maximum value may be applied to the size of the gain. When the determined driving tendency is the mild tendency, a minimum value may be applied to the size of the gain. When the determined driving tendency is the normal tendency, the size of the gain may be determined as a value between the maximum value and the minimum value.

In adjusting the target speed, the target speed may be adjusted by varying a size of a speed change rate applied to the target speed of the plurality of electric superchargers according to the determined driving tendency of the driver.

The determined driving tendency of the driver may be divided into a sporty tendency, a normal tendency, and a mild tendency. When the determined driving tendency is the sporty tendency, a slope of the speed change rate applied to the target speed may be set to be a maximum value. When the determined driving tendency is the mild tendency, a slope of the speed change rate applied to the target speed may be set to be a minimum value. When the determined driving tendency is the normal tendency, a slope of the speed change rate applied to the target speed may be set to be a value between the maximum value and the minimum value.

The determined driving tendency of the driver may be divided into a sporty tendency, a normal tendency, and a mild tendency. When the determined driving tendency is the sporty tendency, the engine may be set to output a maximum torque. When the determined driving tendency is the normal tendency, the engine may be set to output an intermediate torque smaller than the maximum torque. When the determined driving tendency is the mild tendency, the engine may be set to output a minimum torque smaller than the intermediate torque.

In other form, the determined driving tendency of the driver may be divided into a sporty tendency, a normal tendency, and a mild tendency. The SOC electricity-generating region may correspond to a region covering from a SOC start value at which the engine starts charging the battery to a SOC finish value at which the engine finishes charging the battery.

When the determined driving tendency is the mild tendency, the SOC start value may be set to a SOC minimum value within a SOC-low region, and the SOC finish value is set to a SOC minimum value within a SOC-normal region. When the determined driving tendency is the sporty tendency, the SOC start value may be set to a SOC maximum value within the SOC-low region, and the SOC finish value is set to a SOC maximum value within the SOC-normal region. When the determined driving tendency is the normal tendency, the SOC start value may be set to a SOC intermediate value between the SOC minimum value within the SOC-low region and the SOC maximum value within the SOC-normal region, and the SOC finish value is set to a SOC intermediate value between the SOC minimum value within the SOC-normal region and the SOC maximum value within the SOC-normal region.

According to an apparatus of controlling an engine including an electric supercharger based on a driver's tendency, and a method thereof according to an exemplary form of the present disclosure, a SOC of a battery and an operation of an electric supercharger are controlled based on the driver's tendency to vary driving characteristic of the engine, and thereby enhancement of fuel consumption and driving performance of a vehicle may be simultaneously achieved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

The drawings and description are to be regarded as illustrative in nature and not restrictive, and like reference numerals designate like elements throughout the specification.

Also, the size and thickness of each element are arbitrarily shown in the drawings, but the present disclosure is not necessarily limited thereto, and in the drawings, the thickness of layers, films, panels, regions, etc., are exaggerated for clarity.

Hereinafter, an apparatus of controlling an engine including an electric supercharger based on a driver's tendency, and a method thereof according to an exemplary form is described in detail reference to the drawings.

Figure 1:
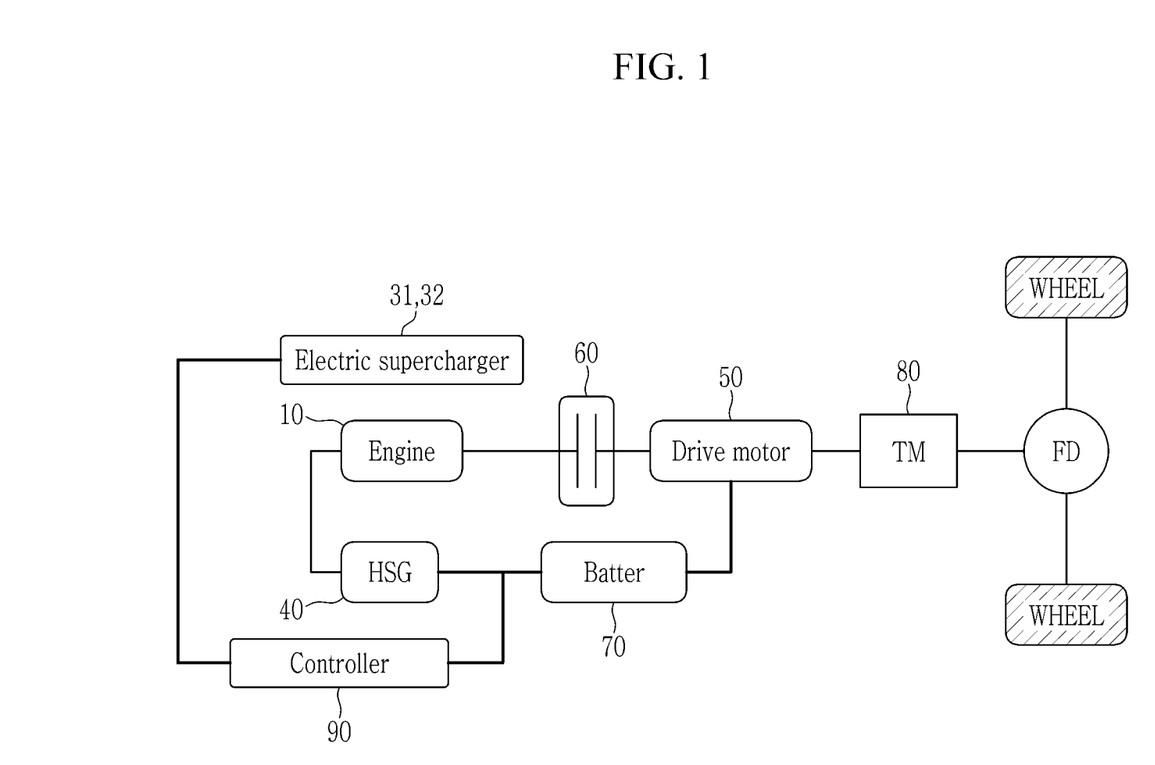
FIG. 1 is a schematic diagram of an apparatus of controlling an engine including an electric supercharger based on a driver's tendency according to an exemplary form.
Figure 2:
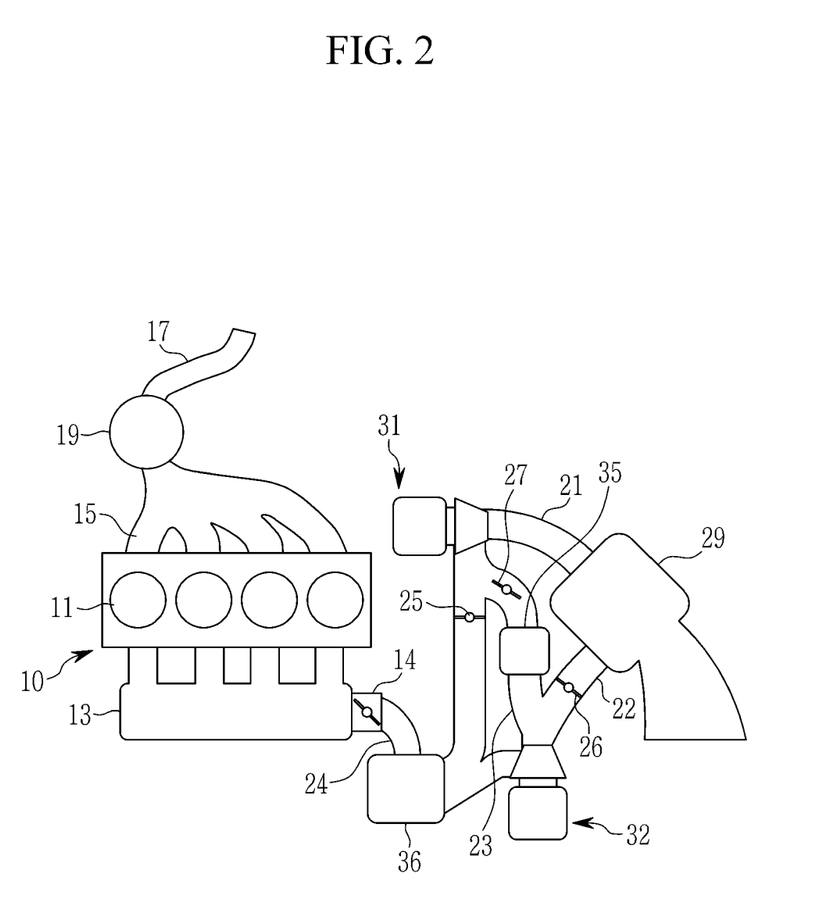
FIG. 2 is schematic diagram illustrating a relationship between a hybrid vehicle and an electric supercharger according to an exemplary form of the present disclosure.

FIG. 1 is a schematic diagram of an apparatus of controlling an engine including an electric supercharger based on a driver's tendency according to an exemplary form of the present disclosure. FIG. 2 is schematic diagram illustrating a relationship between a hybrid vehicle and an electric supercharger according to another exemplary form. In addition, FIG. 3 is a block diagram illustrating an apparatus of controlling an engine including an electric supercharger based on a driver's tendency according to an exemplary form of the present disclosure.

Hereinafter, a hybrid vehicle according to an exemplary form takes an example of a transmission mounted electric device (TMED) structure. However, the scope of the present disclosure is not limited thereto, and may be applied to another type of hybrid electric vehicle.

Figure 3:
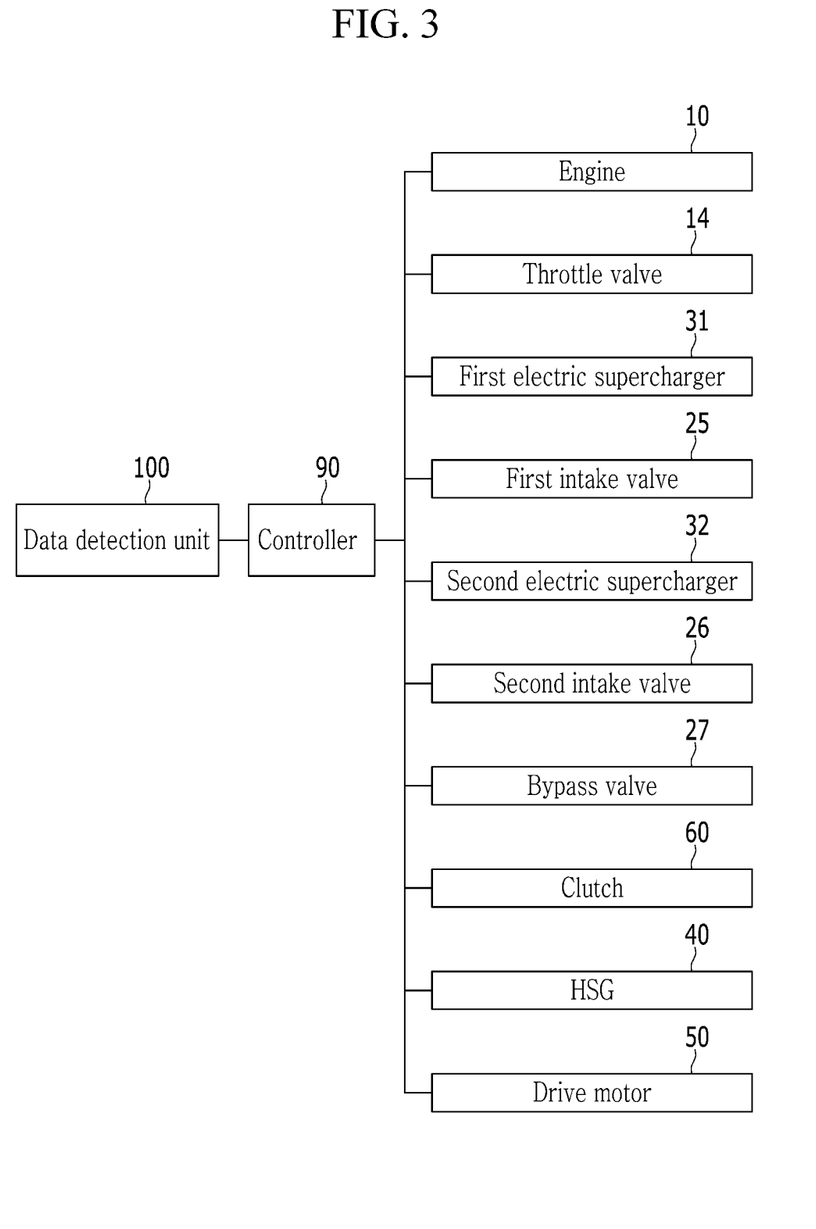
FIG. 3 is a block diagram illustrating an apparatus of controlling an engine including an electric supercharger based on a driver's tendency according to an exemplary form of the present disclosure.

As shown in FIG. 1 to FIG. 3, a hybrid vehicle applied with an apparatus of controlling an engine including an electric supercharger based on a driver's tendency according to an exemplary form may include: an engine 10, an HSG 40, a drive motor 50, a clutch 60, a the battery 70, an accelerator pedal position sensor, and a controller 90.

The engine 10 generates power by combusting fuel.

Referring to FIG. 2, an intake air supplied to combustion chambers 11 of the engine 10 is supplied through a plurality of intake lines, and an exhaust gas exhausted from the combustion chambers 11 of the engine 10 is exhausted through an exhaust manifold 15 and an exhaust line 17. A catalytic converter 19 for purifying exhaust gas is installed in the exhaust line 17.

The plurality of intake lines may include: a first intake line 21 through which an ambient air supplied to the combustion chamber 11 flows, and a second intake line 22 through which an ambient air supplied to the combustion chamber 11 flows. However, the scope of the present disclosure is not limited thereto.

A connection line 23 connecting the first intake line 21 and the second intake line 22 is installed between the first intake line 21 and the second intake line 22. That is, the connection line 23 branches from the first intake line 21 and joins the second intake line 22.

Each electric supercharger installed in the first intake line 21 and the second intake line 22 are for supplying charged air to the combustion chamber 11, and includes a motor and an electric compressor. The electric compressor is operated by the motor, compresses the ambient air according to driving conditions, and supplies the compressed air to the combustion chamber 11.

A first intake valve 25 is installed in the first intake line 21. In more detail, the first intake valve 25 may be installed in a downstream side of a first electric supercharger 31 installed in the first intake line 21. An intake amount supplied through the first intake line 21 is adjusted by an opening of the first intake valve 25.

A second intake valve 26 is installed in the second intake line 22. In more detail, the second intake valve 26 may be installed in a downstream side of a second electric supercharger 32 installed in the second intake line 22. An intake amount supplied through the second intake line 22 is adjusted by an opening of the second intake valve 26.

The first intake line 21 and the second intake line 22 join at a main intake line 24, and a main intercooler 36 may be installed in the main intake line 24. The air compressed by the electric supercharger(s) is cooled by the main intercooler 36.

A bypass valve 27 is installed on the connection line 23. In one form, an auxiliary intercooler 35 may be installed in the connection line 23. The air compressed by the first electric supercharger 31 is cooled by the auxiliary intercooler 35.

An air cleaner 29 for filtering an ambient air flowing in from an outside is mounted at an inlet of the first intake line 21 and the second intake line 22.

An intake air flowing in through the first intake line 21 and the second intake line 22 is supplied to the combustion chamber 11 through the intake manifold 13. The intake manifold 13 is equipped with a throttle valve 14 to adjust an air amount supplied to the combustion chamber 11.

In an exemplary form, the two electric superchargers 31, 32 may operate in three driving modes. The three driving modes may include a solitary mode, a serial mode, and a parallel mode.

The solitary mode is a mode in which only one electric supercharger operates to supply a charged air to the combustion chamber 11 of the engine 10. In the solitary mode, only one electric supercharger (e.g., the first electric supercharger 31) of the two electric superchargers is operated, and the other electric supercharger (e.g., the second electric supercharger 32) is not operated. At this time, the second intake valve 26 and the bypass valve 27 are closed, and the charged air amount supplied to the combustion chamber 11 may be determined by an opening of the first intake valve 25 and the rotation speed of the first electric supercharger 31. The electric supercharger may be operated in the solitary mode in a low load region.

The serial mode is a mode in which two electric superchargers operate to supply doubly charged air to the combustion chamber 11 of the engine 10. At this time, the first intake valve 25 and the second intake valve 26 are both closed, and the charged air amount supplied to the combustion chamber 11 is adjusted by adjusting an opening of the bypass valve 27. In addition, the controller 90 operates the first electric supercharger 31 and the second electric supercharger 32, and supplies the air charged by the first electric supercharger 31 and the second electric supercharger 32 to the combustion chamber 11.

That is, the ambient air that flowed into the first intake line is primarily boosted by the first electric supercharger 31, and then flowed into the second intake line 22 through the connection line 23. In addition, the air is additionally boosted by the second electric supercharger 32.

The electric supercharger may be operated in the serial mode in a low-medium speed high-load region. Since a high compression ratio is required in the low-medium speed high-load region, the compression ratio of ambient air supplied to the combustion chamber 11 may be increased by driving the first electric supercharger 31 and the second electric supercharger 32 in series.

The parallel mode is a mode in which each of two electric superchargers supplies charged air to the combustion chamber 11 of the engine 10. At this time, the controller 90 controls the bypass valve 27 to be closed, and controls the opening of the first intake valve 25 and the second intake valve 26 to control the amount of charged air supplied to the combustion chamber 11. In addition, the controller 90 operates the first electric supercharger 31 and the second electric supercharger 32, and supplies air charged by the first electric supercharger 31 and the second electric supercharger 32 to the combustion chamber 11, respectively.

The electric superchargers may be operated in the parallel mode in a high-speed high-load region. Since the high-speed high-load region require a large amount of ambient air, intake air is supplied to the combustion chamber 11 through the first intake line 21 and the second intake line 22. That is, by driving the first electric supercharger 31 and the second electric supercharger 32 in parallel, a large amount of intake air may be supplied to the combustion chamber 11.

Referring back to FIG. 1, the HSG 40 starts the engine 10 and selectively operates as a generator to generate electrical energy when the engine 10 is started.

The drive motor 50 assists the power of the engine 10 and selectively operates as a generator to generate electrical energy.

The drive motor 50 is operated by using an electrical energy charged in the battery 70, and the electrical energy generated by the drive motor 50 and the HSG 40 is charged in the battery 70.

Figure 4:
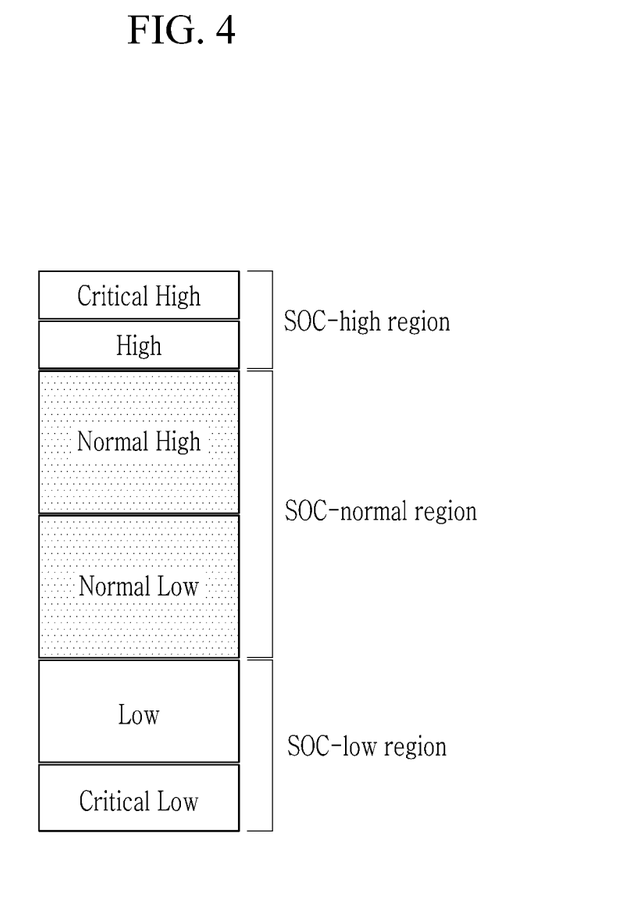
FIG. 4 is a schematic diagram illustrating SOC regions of a battery according to an exemplary form of the present disclosure.

In a hybrid vehicle according to an exemplary form, the power of the engine 10 and the power of the drive motor 50 power are distributed in the SOC (state of charge) region of the battery 70. In an exemplary form, the SOC of the battery 70 may be divided into three regions. Referring to FIG. 4, the SOC regions of the battery 70 may be divided into a high region, a normal region, and a low region. In addition, the high region may be divided into critical high (CH) and high (H) regions, the normal region may be divided into normal high (NH) and normal low (NL) regions, and the low region may be divided into low (L) and critical low (CL) regions.

The accelerator pedal position sensor detects an operation of the accelerator pedal. The accelerator pedal position detected by the accelerator pedal position sensor is transmitted to the controller 90. The controller 90 may determine a requested power based on the driver's acceleration intention according to the accelerator pedal position detected by the accelerator pedal position sensor, and the driving mode may be selectively switched from EV mode to HEV mode.

The controller 90 controls the vehicle's constituent elements including the engine 10, the HSG 40, the drive motor 50, the electric superchargers 31 and 32, the battery 70, and the clutch 60.

The controller 90 may be provided as at least one processor operable by a predetermined program, where the predetermined program may include instructions to perform respective steps of a method of controlling an engine including an electric supercharger based on a driver's tendency according to an exemplary form.

The clutch 60 is provided between the engine 10 and the drive motor 50, and depending on whether the clutch 60 is engaged, the hybrid vehicle is operated in the electric vehicle (EV) mode or in the hybrid electric vehicle (HEV) mode. The EV mode is a mode in which the vehicle is driven only by the driving torque of the motor, and the HEV mode is a mode in which the vehicle is driven by the driving torque of the motor and the engine 10.

The driving power output from the engine 10 and the drive motor 50 is transmitted to a drive wheel provided in the vehicle. At this time, a transmission 80 is provided between the clutch 60 and the drive wheel. A shifting gear is installed within the transmission 80, and the torque output from the engine 10 and the drive motor 50 is shifted according to a shift-stage.

Hereinafter, a method of controlling an engine including an electric supercharger based on a driver's tendency according to an exemplary form is described in detail reference to the drawings.

Figure 5:
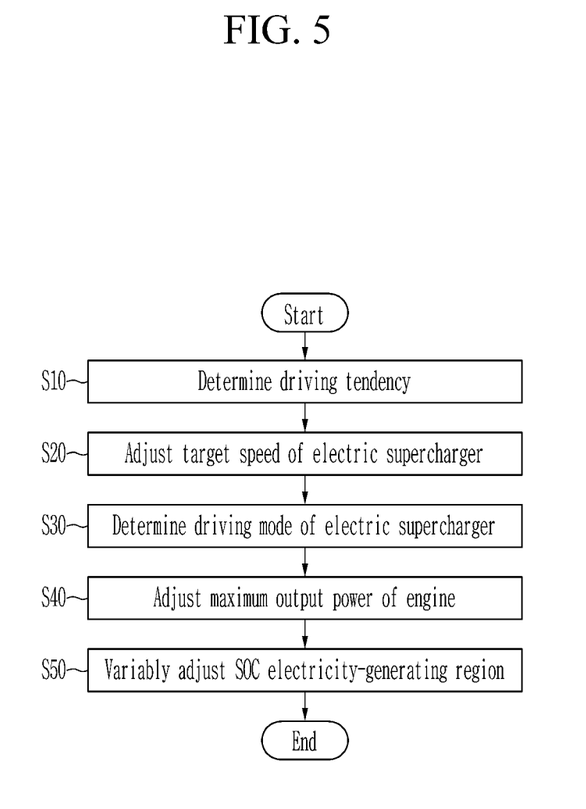
FIG. 5 is a flowchart illustrating a method of controlling an engine including an electric supercharger based on a driver's tendency according to an exemplary form of the present disclosure.

FIG. 5 is a flowchart illustrating a method of controlling an engine including an electric supercharger based on a driver's tendency according to an exemplary form.

Referring to FIG. 5, firstly at step S10, the controller 90 determines the driver's driving tendency based on data detected by the data detection unit.

The data detection unit detects data for determining the driver's driving tendency, and the data detected by the data detection unit is transmitted to the controller. For such a purpose, the data detection unit may include the accelerator pedal position sensor, a vehicle speed sensor, a navigation device, and a global positioning system (GPS).

The accelerator pedal position sensor measures the degree to which the driver presses the accelerator pedal. That is, the accelerator pedal position sensor measures data related to the driver's acceleration intention.

The vehicle speed sensor measures the speed of the vehicle and is mounted on the vehicle wheel.

The navigation device is a device that informs the driver of a path to a destination. The navigation device includes an input and output unit that inputs and outputs information on route guidance, a current position detection unit that detects information on the current position of the vehicle, a memory that stores map data necessary for route calculation and data required for guidance, and a controller for executing route search or the route guidance. However, in an exemplary form, it is sufficient for the navigation device to provide information about the shape of the road, such as the road's gradient or the curvature radius of the road. Therefore, it should be understood that the navigation device in this specification and the claims range may include any device that may provide information about the shape of the road to the controller.

The GPS receives radio waves transmitted from GPS satellites and sends a signal to the navigation device.

The controller 90 determines a driver's short-term driving tendency for a relatively short time based on the data detected by the data detection unit. That is, the controller 90 may determine the driver's driving tendency, for example, during the current driving or during a predetermined time in the current driving. The driver's short-term driving tendency may be determined based on how well a plurality of fuzzy rules related to the driver's tendency are satisfied, and a fuzzy control theory may be used to determine the driver's short-term driving tendency. For this purpose, the controller 20 may be provided as at least one processor operable by a predetermined program, where the predetermined program may include instructions to execute respective steps of a method for determining driver's tendency according to an exemplary form.

The driver's driving tendency determined through the controller 90 may be divided into mild, normal, and sporty tendencies. The mild driving tendency may mean a driver having a defensive driving pattern with a moderate acceleration habit, the sporty driving tendency may mean a driver having an aggressive driving pattern with a rapid acceleration habit, and the normal driving tendency may mean a driver having an intermediate driving tendency between the mild driving tendency and the sporty driving tendency.

The controller 90 may control a target speed of the electric supercharger based on the driver's driving tendency, determine the driving mode of the electric supercharger, limit a maximum output of the engine, and variably adjust a SOC electricity-generating region that charges the battery by the engine.

First, at step S20, the controller 90 adjusts the target speed of the electric supercharger based on the driver's driving tendency.

At this time, the controller 90 adjusts the target speed by differently adjusting the size of a gain of a speed filter applied to the target speed of the electric supercharger according to the driver's driving tendency.

At this time, the target speed of the electric supercharger may be determined as follows. First, a target torque of the engine is determined from a current speed of the vehicle and a requested torque of the driver. In addition, a target air amount and a target boost pressure to be supplied to the combustion chamber 11 are determined from the target torque of the engine.

An amount of air passing through the electric supercharger is determined from the target air amount to be supplied to the combustion chamber 11, and a pressure ratio of pressures at upstream and downstream sides of the electric superchargers is determined from the target boost pressure.

The target speed of the electric supercharger is determined from the pressure ratio and the air amount passing through the electric supercharger. The target speed of the electric supercharger according to the pressure ratio and the air amount passing through the electric supercharger may be beforehand stored in the controller 90 in the map data format.

Figure 6:
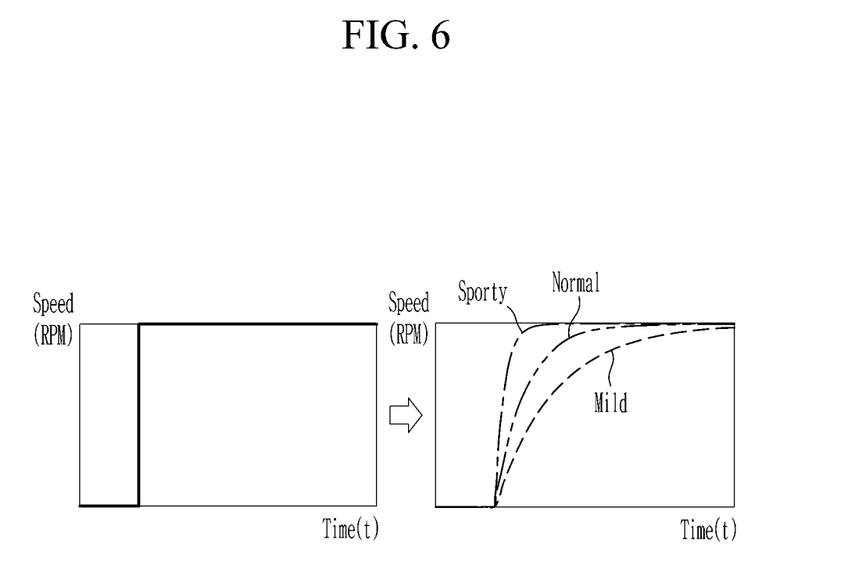
FIG. 6 is a graph illustrating a target speed of an electric supercharger when a gain of a speed filter of an electric supercharger is adjusted according to a driver's tendency in an apparatus of controlling an engine including an electric supercharger based on a driver's tendency according to an exemplary form of the present disclosure.

Referring to FIG. 6, when the target speed of the electric supercharger input to the controller 90 abruptly changes as a step input, the controller 90 adjusts the target speed by applying a speed filter to the target speed. At this time, the speed filter may be a first order filter or a low pass filter.

That is, the controller 90 may adjust a variation in the target speed by adjusting the gain of the speed filter on the target speed of the electric supercharger.

For example, when the driver's driving tendency is a mild driving tendency, an abruptly changing target speed of the electric supercharger may be adjusted to be gentle, by applying a speed filter having a maximum value of the gain to the target speed of the electric supercharger input as a step input (refer to a dotted line in FIG. 6). As such, by maximizing the gain size of a speed filter to adjust the target speed to be gentle, an abrupt speed change of the electric supercharger may be prevented and electric power consumption at a peak of the target speed may be limited.

When the driver's driving tendency is a sporty driving tendency, an abruptly changing target speed of the electric supercharger quickly follow, by applying a speed filter having a minimum value of the gain to the target speed of the electric supercharger input as a step input (refer to a single-dot chain line in FIG. 6). As such, by minimizing the gain size of the speed filter to follow the change of the target speed as closely as possible, engine responsiveness may be maximized.

When the driver's driving tendency is a normal driving tendency, an abruptly changing target speed of the electric supercharger may be adjusted in an intermediate level, by applying a gain size of an intermediate value between the maximum value and the minimum value to the target speed of the electric supercharger input as a step input (refer to a double-dot chain line in FIG. 6). As such, by adjusting the gain size of the speed filter to the intermediate level, the reaction speed of the electric supercharger is adjusted to an intermediate level between the mild driving tendency and the spot driving tendency. Consequently, a balance of the engine responsiveness and the electric power consumption of at the peak of the target speed may be maintained.

Figure 7:
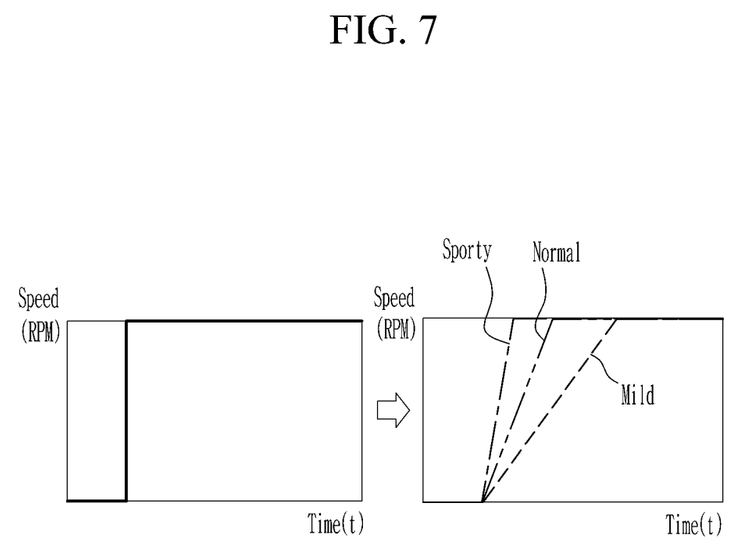
FIG. 7 is a graph illustrating a target speed of an electric supercharger when speed change rate of an electric supercharger is adjusted according to a driver's tendency in an apparatus of controlling an engine including an electric supercharger based on a driver's tendency according to an exemplary form of the present disclosure.

The controller 90 may adjust the target speed by varying the speed change rate applied to the target speed of the electric supercharger according to the driver's driving tendency.

Referring to FIG. 7, the target speed of the electric supercharger input to the controller 90 abruptly changes as a step input, the controller 90 may limit the speed change rate (a speed change per unit time) of the target speed to adjust the target speed.

For example, when the driver's driving tendency is a mild driving tendency, a slope of the speed change rate applied to the target speed of the electric supercharger input as a step input is set to a minimum value, and the abruptly changing target speed may be adjusted to be gentle (refer to a dotted line in FIG. 7). As such, by adjusting the target speed to be gentle, an abrupt speed change of the electric supercharger may be prevented and electric power consumption at a peak of the target speed may be limited.

When the driver's driving tendency is a sporty driving tendency, a slope of the speed change rate applied to the target speed of the electric supercharger input as a step input is set to a maximum value, and the abruptly changing target speed of the electric supercharger may be altered as little as possible (refer to a single-dot chain line in FIG. 7). As such, by following the change of the target speed as closely as possible, engine responsiveness may be maximized.

When the driver's driving tendency is a normal driving tendency, a slope of the speed change rate applied to the target speed of the electric supercharger input as a step input is set to an intermediate value between the maximum value and the minimum value, and the abruptly changing target speed of the electric supercharger may be adjusted in an intermediate level (refer to a double-dot chain line in FIG. 7). As such, by adjusting the reaction speed of the electric supercharger to an intermediate level between the mild driving tendency and the spot driving tendency, a balance of the engine responsiveness and the electric power consumption of at the peak of the target speed may be maintained.

Subsequently at step S30, the controller 90 determines the driving mode of the electric supercharger based on the driver's driving tendency.

When the driver's driving tendency is mild, a single electric supercharger may be sufficient for a boost since the maximum torque of the engine is limited. In such a case, the controller 90 may control the electric supercharger to operate in the solitary mode.

When the driver's driving tendency is normal or sporty and a high boost pressure is required as in a low-medium speed high-load region, the controller 90 may control the electric supercharger in the serial mode.

In addition, when the driver's driving tendency is normal or sporty and a large amount of air is required to be supplied to the combustion chamber 11 as in a high-speed high-load region, the controller 90 may control the electric supercharger in in the parallel mode.

At step S40, the controller 90 limits (or adjusts) the maximum output of the engine based on the driver's driving tendency.

Figure 8:
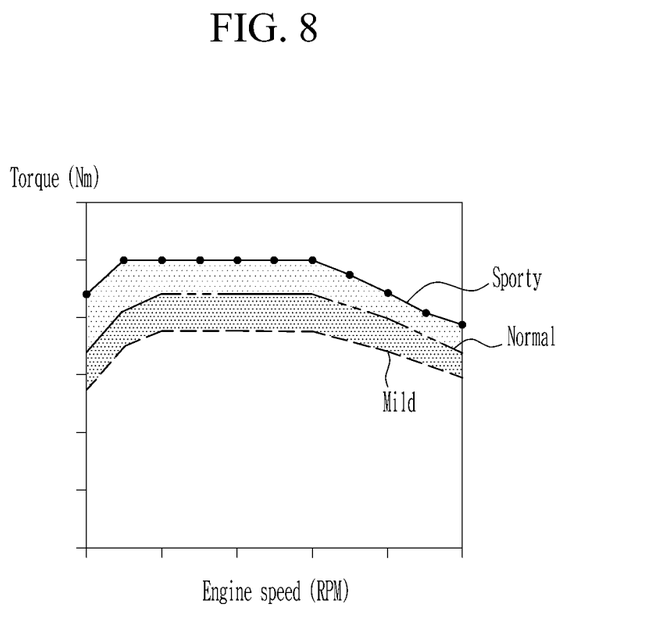
FIG. 8 is a graph illustrating engine driving points according to a driver's tendency in an apparatus of controlling an engine including an electric supercharger based on a driver's tendency according to an exemplary form of the present disclosure.

Referring to FIG. 8, when the driver's driving tendency is a sporty driving tendency, the controller 90 sets the engine to output a maximum torque at all speed region (refer to a solid line in FIG. 8), and thereby maximizes the engine output and drivability.

When the driver's driving tendency is a normal driving tendency, the controller 90 sets the engine to output an intermediate torque smaller than the maximum torque at all speed region (refer to a single-dot chain line in FIG. 8), and thereby controls the engine to maintain an appropriate output performance.

When the driver's driving tendency is a mild driving tendency, the controller 90 sets the engine to output a minimum torque smaller than the intermediate torque at all speed region (refer to a dotted line in FIG. 8), and thereby actively limits an output of the engine and prevents the engine to enter a driving point of bad efficiency.

At step S50, the controller 90 variably adjusts the SOC electricity-generating region that charges the battery by the engine based on the driver's driving tendency.

Figure 9:
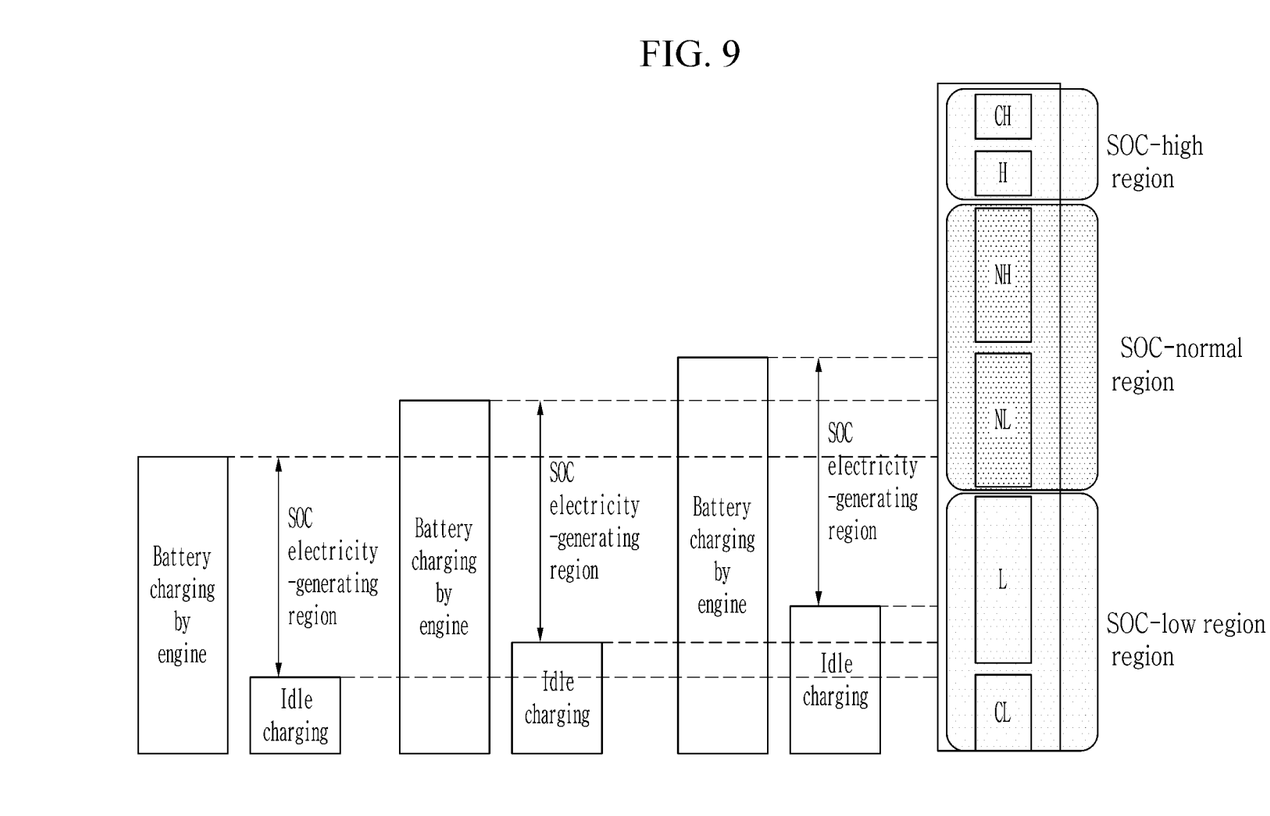
FIG. 9 is a schematic diagram illustrating electricity generating regions through an engine according to a driver's tendency in an apparatus of controlling an engine including an electric supercharger based on a driver's tendency according to an exemplary form of the present disclosure.

The SOC electricity-generating region may mean a region of from a SOC start value to start charging of the battery by the engine to a SOC finish value to finish the charging of the battery by the engine, to maintain the SOC to an appropriate level. The SOC start value may be set within a SOC-low region, and the SOC finish value may be set within a SOC-normal region.

Referring to FIG. 9, when the driver's driving tendency is a mild driving tendency, the controller 90 sets the SOC start value to the SOC minimum value in the SOC-low region, and thereby minimizes charging the battery by the engine. In addition, by setting the SOC finish value to the SOC minimum value in the SOC-normal region, an excessive charging by the engine is prevented.

When the driver's driving tendency is a sporty driving tendency, the controller 90 sets the SOC start value to the SOC maximum value in the SOC-low region, and sets the SOC finish value to the SOC maximum value in the SOC-normal region, thereby securing an electric power for driving the electric supercharger and minimizing the charging of the battery using the engine output when high-load driving is required.

When the driver's driving tendency is a normal driving tendency, the controller 90 sets the SOC start value to the SOC intermediate value between the SOC minimum value in the SOC-low region and the SOC maximum value in the SOC-normal region, and sets the SOC finish value to the SOC intermediate value between the SOC minimum value in the SOC-normal region and the SOC maximum value in the SOC-normal region, thereby maintaining the charged state of the battery to an appropriate level.

That is, the SOC start value and SOC finish value gradually increase as the driver's driving tendency goes to mild, normal, and sporty.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

DESCRIPTION OF SYMBOLS

10: engine
11: combustion chamber
13: intake manifold
14: throttle valve
15: exhaust manifold
17: exhaust line
19: catalytic converter
21: first intake line
22: second intake line
23: connection line
24: main intake line
25: first intake valve
26: second intake valve
27: bypass valve
29: air cleaner
31: first electric supercharger
32: second electric supercharger
35: auxiliary intercooler
36: main intercooler
40: HSG
50: drive motor
60: clutch
70: battery
80: transmission
90: controller
100: data detection unit

What is claimed is:

1. An apparatus of controlling an engine including an electric supercharger, the apparatus comprising:
    an engine configured to combust fuel to generate power;
    a drive motor configured to assist the power of the engine and to selectively operate as a generator to generate electrical energy;
    a battery configured to supply electrical energy to the drive motor and to be charged by the electrical energy generated from the drive motor;
    a plurality of electric superchargers respectively installed in a plurality of intake lines through which an ambient air flows to be supplied to a combustion chamber of the engine; and
    a controller configured to, based on a driving tendency of a driver, adjust a target speed of electric superchargers of the plurality of electric superchargers, determine a driving mode of the electric superchargers of the plurality of electric superchargers, limit a maximum output of the engine, and variably adjust a state of charge (SOC) electricity-generating region in which the engine charges the battery,
    wherein:
        the driving tendency of the driver is divided into a sporty tendency, a normal tendency, and a mild tendency; and
        the SOC electricity-generating region corresponds to a region covering from a SOC start value at which the engine starts charging the battery to a SOC finish value at which the engine finishes charging the battery, and
    wherein:
        when the driving tendency is the mild tendency, the controller is configured to set the SOC start value to a SOC minimum value within a SOC-low region, and set the SOC finish value to a SOC minimum value within a SOC-normal region;
        when the driving tendency is the sporty tendency, the controller is configured to set the SOC start value to a SOC maximum value within the SOC-low region, and set the SOC finish value to a SOC maximum value within the SOC-normal region; and
        when the driving tendency is the normal tendency, the controller is configured to set the SOC start value to a SOC intermediate value between the SOC minimum value within the SOC-low region and the SOC maximum value within the SOC-normal region, and set the SOC finish value to a SOC intermediate value between the SOC minimum value within the SOC-normal region and the SOC maximum value within the SOC-normal region.

2. The apparatus of claim 1, wherein the controller is configured to adjust the target speed by differently adjusting a size of a gain of a speed filter applied to the target speed of the electric superchargers of the plurality of electric superchargers based on the driving tendency of the driver.

3. The apparatus of claim 2, wherein:
    when the driving tendency is the sporty tendency, the controller is configured to apply a maximum value to the size of the gain;
    when the driving tendency is the mild tendency, the controller is configured to apply a minimum value to the size of the gain; and
    when the driving tendency is the normal tendency, the controller is configured to determine the size of the gain as a value between the maximum value and the minimum value.

4. The apparatus of claim 1, wherein the controller is configured to adjust the target speed by varying a speed change rate applied to the target speed of the electric superchargers of the plurality of electric superchargers based on the driving tendency of the driver.

5. The apparatus of claim 4, wherein:
    when the driving tendency is the sporty tendency, the controller is configured to set a slope of the speed change rate applied to the target speed to be a maximum value;
    when the driving tendency is the mild tendency, the controller is configured to set a slope of the speed change rate applied to the target speed to be a minimum value; and
    when the driving tendency is the normal tendency, the controller is configured to set a slope of the speed change rate applied to the target speed to be a value between the maximum value and the minimum value.

6. The apparatus of claim 1, wherein:
    when the driving tendency is the sporty tendency, the controller is configured to set the engine to output a maximum torque;
    when the driving tendency is the normal tendency, the controller is configured to set the engine to output an intermediate torque smaller than the maximum torque; and
    when the driving tendency is the mild tendency, the controller is configured to set the engine to output a minimum torque smaller than the intermediate torque.

7. A method of controlling an engine including an electric supercharger, the method comprising:
    determining, by a controller, a driving tendency of a driver;
    adjusting, by the controller, a target speed of a plurality of electric superchargers based on the determined driving tendency;
    determining, by the controller, a driving mode of the plurality of electric superchargers based on the determined driving tendency; and
    variably adjusting, by the controller, based on the determined driving tendency, a state of charge (SOC) electricity-generating region where the engine charges a battery,
    wherein:
        the determined driving tendency is divided into a sporty tendency, a normal tendency, and a mild tendency; and
        the SOC electricity-generating region corresponds to a region covering from a SOC start value at which the engine starts charging the battery to a SOC finish value at which the engine finishes charging the battery, and
    wherein:
        when the determined driving tendency is the mild tendency, the SOC start value is set to a SOC minimum value within a SOC-low region, and the SOC finish value is set to a SOC minimum value within a SOC-normal region;
        when the determined driving tendency is the sporty tendency, the SOC start value is set to a SOC maximum value within the SOC-low region, and the SOC finish value is set to a SOC maximum value within the SOC-normal region; and
        when the determined driving tendency is the normal tendency, the SOC start value is set to a SOC intermediate value between the SOC minimum value within the SOC-low region and the SOC maximum value within the SOC-normal region, and the SOC finish value is set to a SOC intermediate value between the SOC minimum value within the SOC-normal region and the SOC maximum value within the SOC-normal region.

8. The method of claim 7, wherein, in adjusting the target speed, the target speed is adjusted by differently adjusting a size of a gain of a speed filter applied to the target speed of the plurality of electric superchargers based on the determined driving tendency.

9. The method of claim 8, wherein:
when the determined driving tendency is the sporty tendency, a maximum value is applied to the size of the gain;
when the determined driving tendency is the mild tendency, a minimum value is applied to the size of the gain; and
when the determined driving tendency is the normal tendency, the size of the gain is determined as a value between the maximum value and the minimum value.

10. The method of claim 7, wherein, in adjusting the target speed, the target speed is adjusted by varying a size of a speed change rate applied to the target speed of the plurality of electric superchargers based on the determined driving tendency.

11. The method of claim 10, wherein:
when the determined driving tendency is the sporty tendency, a slope of the speed change rate applied to the target speed is set to be a maximum value;
when the determined driving tendency is the mild tendency, a slope of the speed change rate applied to the target speed is set to be a minimum value; and
when the determined driving tendency is the normal tendency, a slope of the speed change rate applied to the target speed is set to be a value between the maximum value and the minimum value.

12. The method of claim 7, wherein:
when the determined driving tendency is the sporty tendency, the engine is set to output a maximum torque;
when the determined driving tendency is the normal tendency, the engine is set to output an intermediate torque smaller than the maximum torque; and
when the determined driving tendency is the mild tendency, the engine is set to output a minimum torque smaller than the intermediate torque.

* * * * *